US009432762B2

(12) United States Patent
Van Schyndel et al.

(10) Patent No.: US 9,432,762 B2
(45) Date of Patent: Aug. 30, 2016

(54) BACK CAVITY MICROPHONE IMPLEMENTATION

(71) Applicant: BLACKBERRY LIMITED, Waterloo (CA)

(72) Inventors: Andre John Van Schyndel, Kanata (CA); Chris Forrester, Kitchener (CA); Sylvain Angrignon, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 178 days.

(21) Appl. No.: 14/093,799

(22) Filed: Dec. 2, 2013

(65) Prior Publication Data

US 2015/0156580 A1 Jun. 4, 2015

(51) Int. Cl.

| | |
|---|---|
| ***H04B 3/00*** | (2006.01) |
| ***H04R 1/28*** | (2006.01) |
| ***H04R 3/02*** | (2006.01) |
| ***H04R 29/00*** | (2006.01) |
| ***G10K 11/16*** | (2006.01) |
| *H04R 3/00* | (2006.01) |

(52) U.S. Cl.

CPC ............. *H04R 1/2803* (2013.01); *G10K 11/16* (2013.01); *H04R 3/02* (2013.01); *H04R 29/001* (2013.01); *H04R 1/2826* (2013.01); *H04R 1/2834* (2013.01); *H04R 3/002* (2013.01); *H04R 2499/11* (2013.01)

(58) Field of Classification Search

CPC ....... H04M 9/082; H04R 3/005; H04R 3/02; H04R 25/453; H04R 27/00; G10L 21/2028; G10L 2021/20282

USPC ................................ 381/66, 17, 59, 303, 92

See application file for complete search history.

(56) References Cited

U.S. PATENT DOCUMENTS

| | | | | |
|---|---|---|---|---|
| 5,191,619 | A | 3/1993 | Hayase | |
| 7,403,611 | B1 * | 7/2008 | He | H04M 1/03 379/388.02 |
| 2007/0223734 | A1 * | 9/2007 | Suzuki et al. | 381/96 |
| 2011/0268309 | A1 * | 11/2011 | Moquin | H04M 1/035 381/386 |
| 2012/0063633 | A1 | 3/2012 | Suzuki et al. | |
| 2012/0134304 | A1 * | 5/2012 | Ng | H04R 1/2811 370/278 |
| 2012/0215519 | A1 * | 8/2012 | Park | G06F 17/289 704/2 |
| 2012/0294450 | A1 * | 11/2012 | Ozcan | 381/59 |
| 2014/0369512 | A1 | 12/2014 | Slupeiks et al. | |

FOREIGN PATENT DOCUMENTS

| | | | |
|---|---|---|---|
| EP | 2456229 | A1 | 5/2012 |
| GB | 2413233 | A | 10/2005 |

OTHER PUBLICATIONS

DSpeaker, VLSI Solution, 2010, p. 4.*

European Extended Search Report; Application No. 14195411.5; Apr. 7, 2015; 6 pages.

* cited by examiner

*Primary Examiner* — Simon Sing

(74) *Attorney, Agent, or Firm* — Conley Rose, P.C.; J. Robert Brown, Jr.

(57) ABSTRACT

A system and method to perform signal processing using a loudspeaker output are described. The system includes an enclosure configured to define a back cavity of the loudspeaker and components to obtain a representation of the loudspeaker acoustic output at the back cavity. The system also includes a processor to process the representation to perform the signal processing.

16 Claims, 6 Drawing Sheets

BACK CAVITY MICROPHONE IMPLEMENTATION

BACKGROUND

Loudspeaker diaphragm motion generates acoustic energy in front of and behind the loudspeaker. The acoustic energy in front provides the expected loudspeaker acoustic output. The acoustic energy in the back is usually confined so that it does not interfere with the loudspeaker acoustic output in the front, but can provide a measure of the loudspeaker acoustic output. In handheld devices, such as smart phones and cell phones, for example, loudspeakers are usually implemented with a sealed back cavity design. That is, the acoustic energy generated in the back of the loudspeaker is confined within a sealed cavity. In this case, an acoustic pressure measurement in the back cavity serves as a measure of the loudspeaker acoustic output. The loudspeaker acoustic output serves as a reference for many purposes. The loudspeaker acoustic output is used as a reference in digital signal processing (DSP) algorithms such as echo cancellation.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As noted above, the loudspeaker acoustic output is a measure used for many purposes including, for example, as a reference in echo cancellation. As also noted above, the acoustic pressure in a back cavity of the loudspeaker is a measure of the loudspeaker acoustic output in most handheld devices. The back cavity pressure measurement may be a more accurate measure for echo cancellation than the traditional voltage applied to the loudspeaker, especially in handheld devices. This is because loudspeakers, used in handheld devices, often display nonlinear distortion that makes the echo path nonlinear. Using the back cavity pressure measurement as the reference signal gives the echo cancellation algorithm a more accurate measure of the true acoustic signal to cancel. However, the microphones used in handheld devices cannot handle the high sound pressure levels (SPL) in the back cavity of the loudspeaker so that obtaining the back cavity pressure is not possible with typical handheld device microphones. For example, lumped element analysis provides an SPL simulation that indicates SPLs in the back cavity are on the order of 55 decibel Pascal (dBPa) in handheld devices. However, typical microphones used in smart phones can deal with 15 to 25 dBPa, and even higher performance microphones deal with only 35 to 40 dBPa. As a result, applications that require loudspeaker acoustic output have used other references for signal processing. In echo cancellation, for example, the voltage applied to the loudspeaker to produce the audio output has been used as a reference. However, because the loudspeaker changes that input prior to outputting the audio signal (the nonlinearity), the voltage reference does not result in accurate echo cancellation. As to another alternative measurement, measuring the acoustic pressure in front of the loudspeaker (rather than in the back cavity) results in an unreliable signal, because acoustic coupling changes based on how a handheld device is held and also because the signal is contaminated with the addition of sound sources (e.g., room noise, handheld device user's voice). Embodiments of the system and method described herein relate to obtaining an attenuated measure of the back cavity pressure as a representation of loudspeaker acoustic output.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
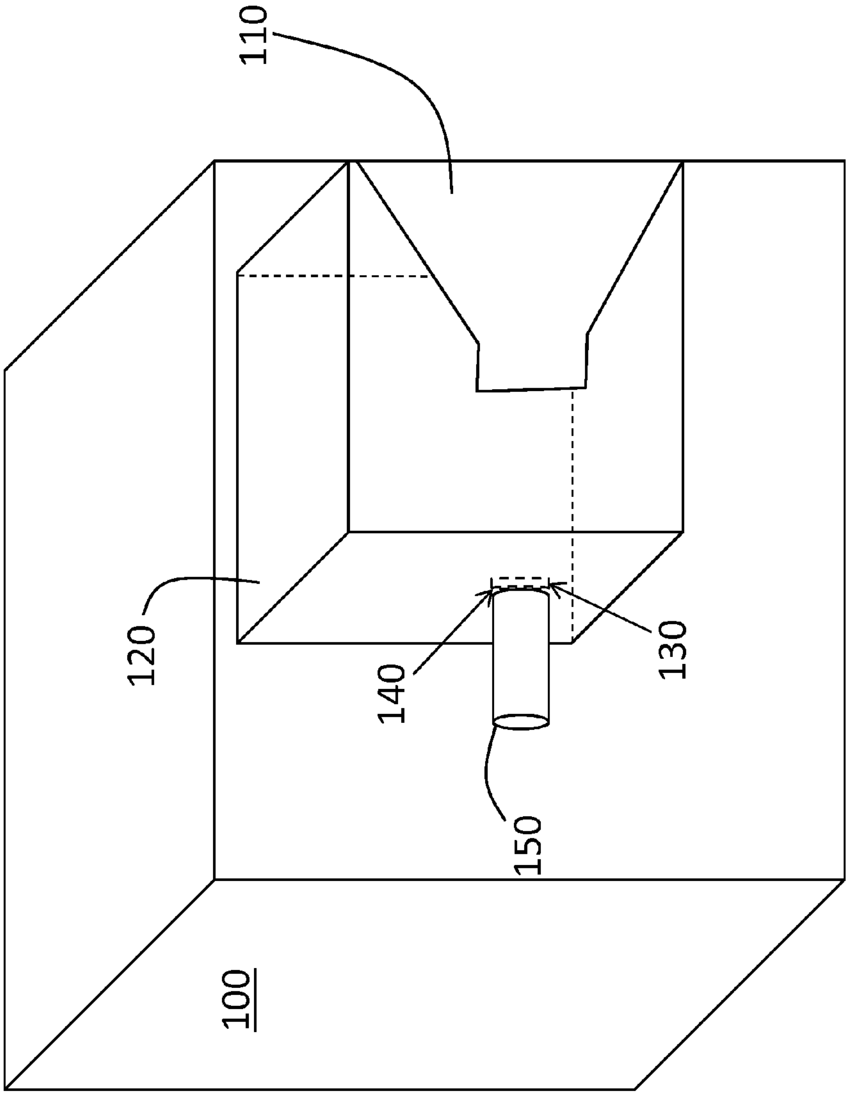
FIG. 1 is a block diagram of a physical system for obtaining a representation of loudspeaker acoustic output according to an embodiment of the invention.

FIG. 1 is a block diagram of a physical system for obtaining a representation of loudspeaker acoustic output according to an embodiment of the invention. A transparent box is shown as a representation of the device 100 that comprises the system for obtaining the representation of loudspeaker acoustic output. The device 100 may be a smart phone, a cell phone, or another handheld device, for example. The loudspeaker 110 of the device 100 is shown with a sealed back cavity 120. While the back cavity 120 is shown in the shape of a cube, alternate shapes are contemplated for both the loudspeaker 110 and the back cavity. An in port 130 (e.g., hole) in the back cavity 120 is shown. A microphone 140 is disposed at the opening or in port 130 in the back cavity 120. An optional out port 150 (e.g., tube) is arranged at the microphone 140 and extends to the interior of the device 100. The ports (in port 130 and out port 150) may both be holes (in the back cavity 120 and in the microphone 140) or one or both may be a tube or have a non-circular cross section. Exemplary dimensions for the in port 130 implemented as a tube may be on the order of 0.3 millimeters (mm) in length with a circular cross section and a diameter on the order of 0.1 mm. Exemplary dimensions for the out port 150 implemented as a tube may be on the order of 1 mm for the length and 1 mm for the diameter.

Figure 2:
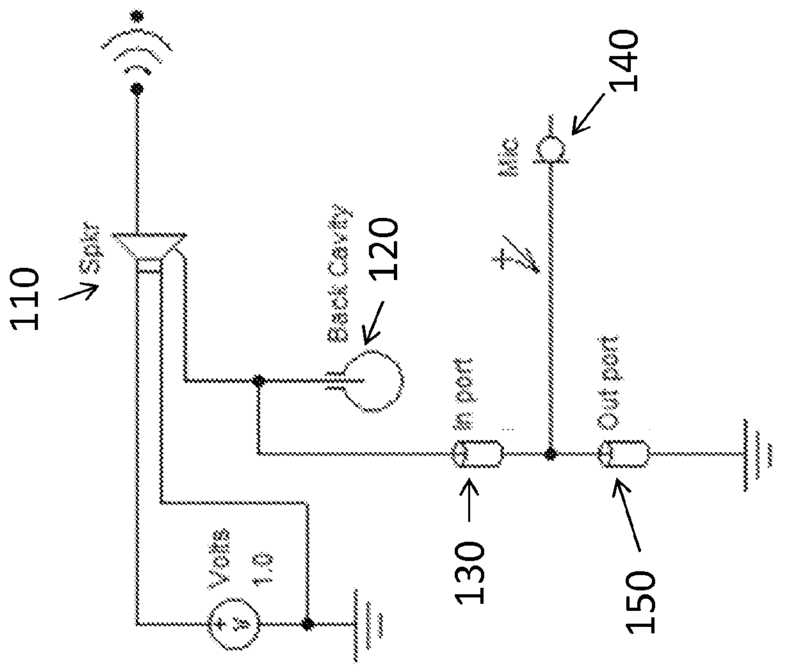
FIG. 2 is an acoustic circuit model of the system shown in FIG. 1.

FIG. 2 is an acoustic circuit model of the system shown in FIG. 1. The system comprises a filter implementation to attenuate the sound from the back cavity 120 to the microphone 140 so that a standard microphone 140 in a device 100 (e.g., handheld) can pick up the sound. The filter implementation includes the in port 130 which may be a hole, for example. As the acoustic circuit model of FIG. 2 indicates, the in port 130 leads directly to a microphone 140. The out port 150, which may be another hole or a tube from the front of the microphone 140 leads to the interior of the device 100 (e.g., smart phone). The microphone 140 acoustic impedance, which is largely capacitive, is part of the filter implementation that attenuates the sound from the back cavity 120. With the filter implementation, even an SPL on the order of 63 dBPa in the back cavity 120 only exposes the microphone 140 to approximately 17 dBPa according to exemplary simulations. Simulations further indicate that the filter implementation (in port 130 and microphone 140 acoustic impedance) and microphone 140 itself do not affect the output of the loudspeaker 110 or the SPL in the back cavity 120.

Figure 3:
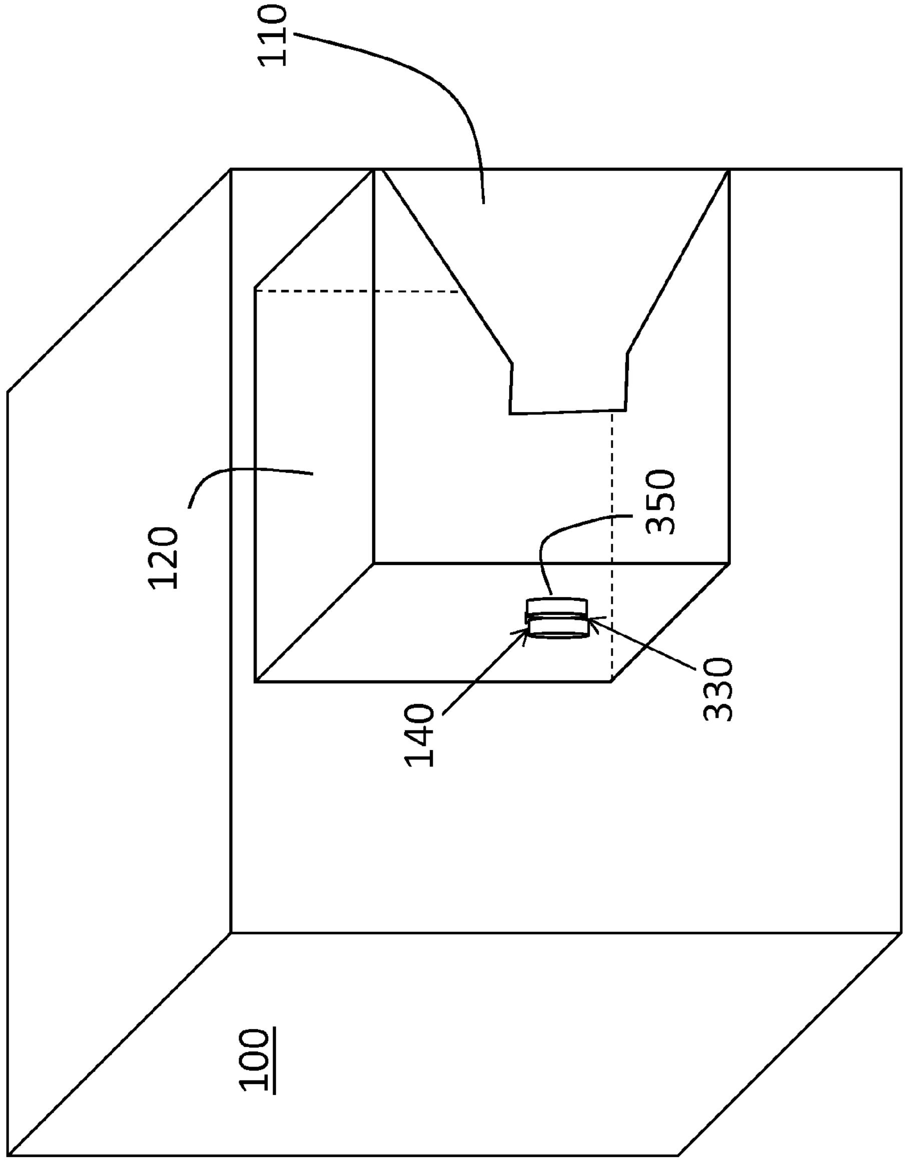
FIG. 3 is a block diagram of another system for obtaining a representation of loudspeaker acoustic output according to another embodiment of the invention.

FIG. 3 is a block diagram of another system for obtaining a representation of loudspeaker acoustic output according to another embodiment of the invention. As in FIG. 1, the loudspeaker 110 and back cavity 120 are shown in a device 100 illustrated as a transparent box. As noted above, the back cavity 120 may have a different shape than the cube shown in FIG. 3. In this embodiment, the SPL in the back cavity 120 is attenuated by a diaphragm 350 (e.g., metal disk). The diaphragm 350 is formed inside the back cavity 120 at an opening 330 (hole) in the back cavity 120. A microphone 140 on the other side of the opening 330 receives an attenuated acoustic pressure based on the diaphragm 350. The pressure in the back cavity 120 distends the diaphragm 350. As the thickness of the diaphragm 350 increases, the pressure decreases. Thus, the amount of attenuation of the SPL at the microphone 140 can be controlled by controlling the thickness of the diaphragm 350.

Figure 4:
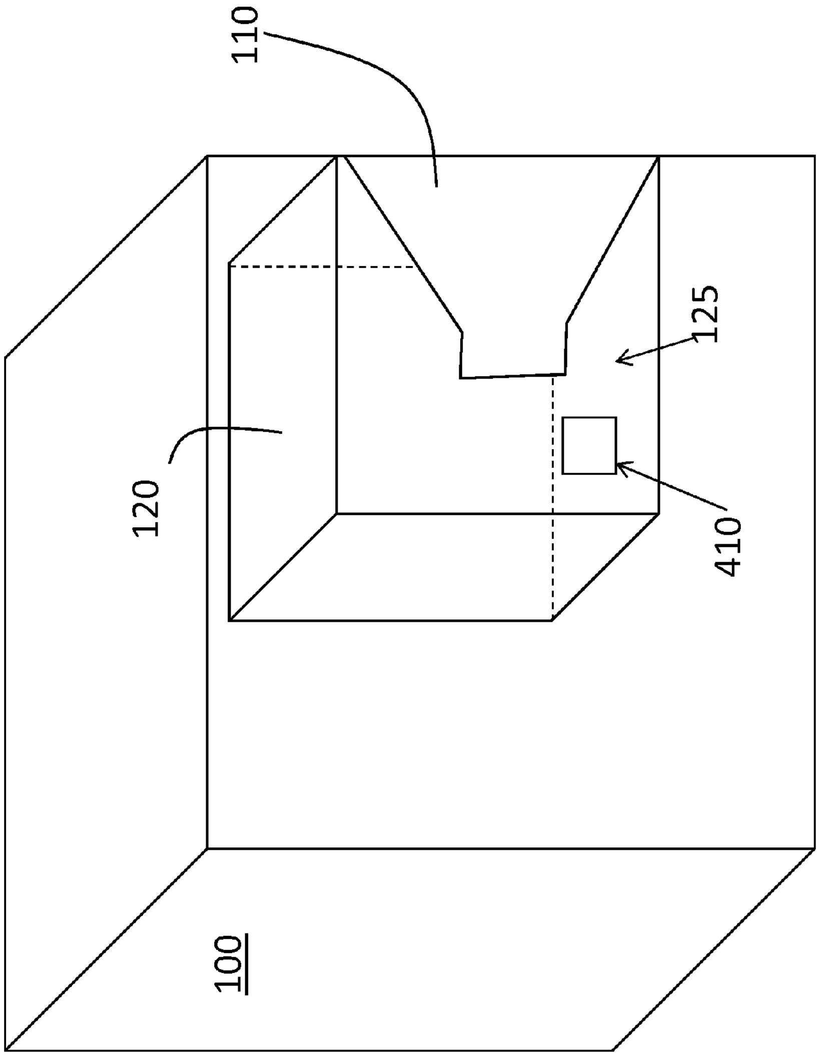
FIG. 4 is a block diagram of another system for obtaining a representation of loudspeaker acoustic output according to another embodiment of the invention.

FIG. 4 is a block diagram of another system for obtaining a representation of loudspeaker acoustic output according to another embodiment of the invention. As in FIGS. 1 and 3, the loudspeaker 110 and back cavity 120 are shown in a device 100 illustrated as a transparent box. The device 100 and the back cavity 120 may have different shapes than shown in FIG. 4. The accelerometer 410 may be mounted to one of the walls 125 of the back cavity 120, as shown in FIG. 4. The wall 125 flexes under the load of the SPL in the back cavity 120. This flexing by the wall 125 is sensed by the accelerometer such that the accelerometer output is an attenuated representation of loudspeaker acoustic output. The amplitude of the flexing can be adjusted by changing the shape and thickness of the wall 125 (changing the spring constant). In this embodiment, the wall 125 acts as a diaphragm and the accelerometer 410 may be thought of as a contact microphone indicating the pressure proportional to SPL in the back cavity 120.

Figure 5:
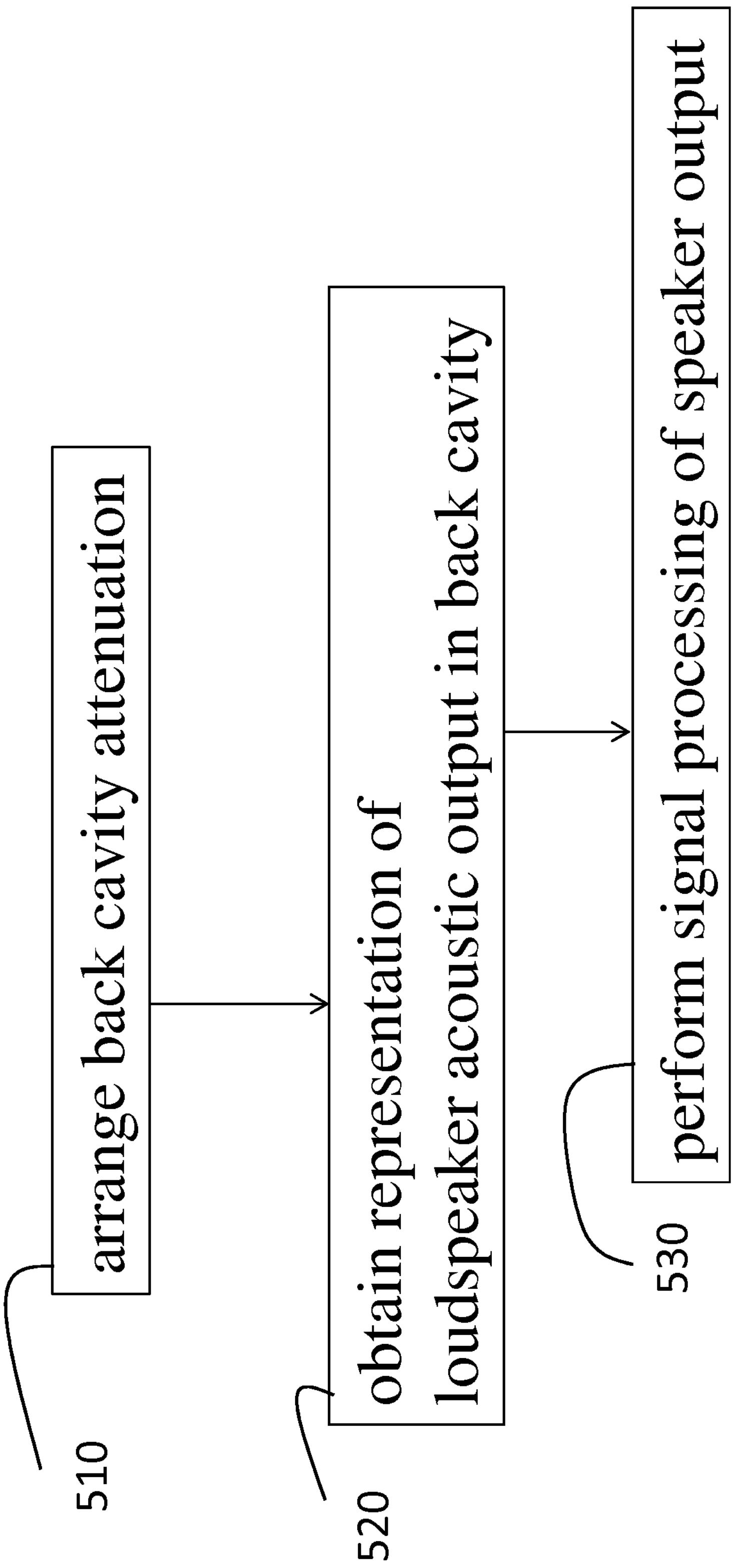
FIG. 5 is a process flow of a method of performing signal processing using loudspeaker output according to embodiments of the invention.

FIG. 5 is a process flow of a method of performing signal processing using loudspeaker 110 output according to embodiments of the invention. At block 510, arranging back cavity attenuation is according to one of the embodiments discussed above. The arranging may include disposing an in port 130 and out port 150 at a wall of the back cavity 120 with a microphone 140 therebetween, as discussed with reference to FIGS. 1 and 2. The arranging may also include disposing a diaphragm 350 inside an opening 330 of the back cavity 120 with a microphone 140 on the other side of the opening 330, as discussed with reference to FIG. 3. The arranging may instead include disposing an accelerometer 410 on a wall 125 of the back cavity 120, as discussed with reference to FIG. 4. At block 520, obtaining a representation of loudspeaker acoustic output in the back cavity 120 is done by measuring acoustic pressure in the back cavity 120. According to the embodiments described herein, obtaining the representation includes obtaining the microphone 140 output or the signal from the accelerometer 410 based on the embodiment being implemented. Performing signal processing (e.g., echo cancellation) based on the loudspeaker 110 output at block 530 includes using the loudspeaker acoustic output representation from the back cavity 120 such that the nonlinear component (echo) is included in the calculation.

Figure 6:
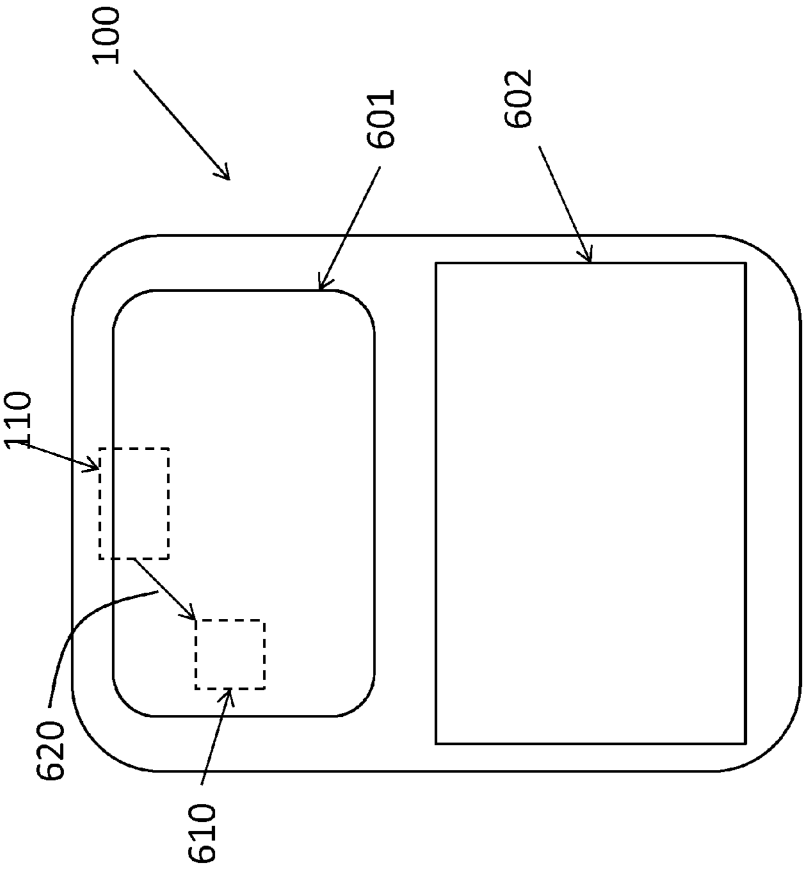
FIG. 6 is an exemplary system to perform signal processing using loudspeaker output according to embodiments of the invention.

FIG. 6 is an exemplary system to perform signal processing using loudspeaker 110 output according to embodiments of the invention. The device 100 may be a handheld device such as a smart phone, for example, and may include a display 601 and input interface 602 (e.g., keyboard). A representation 620 of loudspeaker acoustic output in the back cavity 120 of the loudspeaker 110 is provided to a processing system 610 of the device. The components that provide the representation 620 of loudspeaker acoustic output include the in port 130, out port 150, and the microphone 140 according to one embodiment, a diaphragm 350 and microphone 140 according to another embodiment, and an accelerometer 410 according to yet another embodiment. The processing system 610 includes one or more processors, one or more memory devices, an input interface and an output interface and may be part of the digital signal processing system of the device 100. The representation 620 may be provided to the processing system 610 according to one of the embodiments discussed above. For example, the representation 620 may be microphone 140 output obtained following attenuation of the SPL in the back cavity 120 according to the embodiment discussed with reference to FIGS. 1 and 2.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system to perform signal processing using a loudspeaker acoustic output, the system comprising:

an enclosure configured to define a back cavity of the loudspeaker;

components configured to obtain an attenuated representation of the loudspeaker acoustic output at the back cavity, wherein the components include a port in the back cavity, a microphone having a first side arranged at the port in the back cavity, and a second port disposed on a second side of the microphone; and a processor configured to process the attenuated representation to perform the signal processing.

2. The system according to claim 1, wherein the loudspeaker is disposed in a handheld device.

3. The system according to claim 2, wherein the processor is a digital signal processor of the handheld device.

4. The system according to claim 1, wherein the enclosure is a box or a cylinder.

5. The system according to claim 1, wherein the signal processing includes echo cancellation.

6. The system according to claim 1, wherein the port in the back cavity is a hole in the enclosure.

7. The system according to claim 1, wherein the components further include a diaphragm.

8. The system according to claim 7, wherein the diaphragm is arranged inside the back cavity at an opening in the enclosure and the microphone is arranged on another side of the opening in communication with the diaphragm and is configured to respond to a motion of the diaphragm.

9. The system according to claim 1, wherein the components include an accelerometer arranged on a portion of the enclosure outside the back cavity.

10. A method of performing signal processing of a loudspeaker acoustic output of a device, the method comprising:

enclosing the loudspeaker in an enclosure configured to define a back cavity of the loudspeaker;

obtaining an attenuated representation of the loudspeaker acoustic output in the back cavity;

processing the attenuated representation of the loudspeaker acoustic output using a processor to perform the signal processing;

disposing a port in the back cavity;

arranging a first side of a microphone at the port in the back cavity;

obtaining the attenuated representation of the loudspeaker acoustic output using the microphone; and disposing a second port on a second side of the microphone.

11. The method according to claim 10, wherein the enclosing the loudspeaker includes defining the back cavity using a box or a cylinder.

12. The method according to claim 10, wherein the processing includes performing echo cancellation.

13. The method according to claim 10, wherein the disposing the port in the back cavity includes creating an opening in the back cavity.

14. The method according to claim 10, further comprising disposing a diaphragm in the back cavity at an opening in the back cavity, disposing the microphone outside of the back cavity, and obtaining the attenuated representation of the loudspeaker acoustic output based on the microphone responding to a motion of the diaphragm.

15. The method according to claim 10, further comprising disposing an accelerometer on an outside of a back cavity wall and obtaining the attenuated representation of the loudspeaker acoustic output from the accelerometer.

16. The method according to claim 15, further comprising adjusting a shape and thickness of the back cavity wall to control an amplitude of a signal from the accelerometer.

* * * * *